US012345846B2

(12) United States Patent
Chabert et al.

(10) Patent No.: US 12,345,846 B2
(45) Date of Patent: Jul. 1, 2025

(54) DETECTING OBJECTS SUBMERGED IN A BODY OF WATER OR AT LEAST PARTLY BURIED IN A BED OF THE BODY OF WATER

(71) Applicant: FUGRO N.V., Leidschendam (NL)

(72) Inventors: Anne Marie Chabert, Leidschendam (NL); Laurent Jaunet, Leidschendam (NL); Michael Chivers, Leidschendam (NL); David Holland, Leidschendam (NL)

(73) Assignee: Fugro N.V., Leidschendam (NL)

( * ) Notice: Subject to any disclaimer, the term of this patent is extended or adjusted under 35 U.S.C. 154(b) by 966 days.

(21) Appl. No.: 16/963,177

(22) PCT Filed: Jan. 26, 2019

(86) PCT No.: PCT/EP2019/051928
§ 371 (c)(1),
(2) Date: Jul. 17, 2020

(87) PCT Pub. No.: WO2019/145520
PCT Pub. Date: Aug. 1, 2019

(65) Prior Publication Data
US 2021/0124085 A1    Apr. 29, 2021

(30) Foreign Application Priority Data
Jan. 26, 2018    (DE) .......................... 102018201251.2

(51) Int. Cl.
*B63B 21/66*    (2006.01)
*B63G 8/42*    (2006.01)
(Continued)

(52) U.S. Cl.
CPC ............ *G01V 11/002* (2013.01); *B63B 21/66* (2013.01); *B63G 8/42* (2013.01); *G01V 1/38* (2013.01); *G01V 3/15* (2013.01); *B63B 2211/02* (2013.01)

(58) Field of Classification Search
CPC ........ G01V 3/15; G01V 3/165; G01V 11/002; G01V 3/081; G01V 2210/6163;
(Continued)

(56) References Cited

U.S. PATENT DOCUMENTS

| 3,414,874 A | 12/1968 | McLoad |
| 4,430,613 A | 2/1984 | French |

(Continued)

FOREIGN PATENT DOCUMENTS

| CN | 1651868 A | 8/2005 |
| CN | 103144752 A | 6/2013 |

(Continued)

OTHER PUBLICATIONS

Fugro Geowing, Equipment Flyer, Fugro, www.fugro.com, 1 page, obtained 2023 (Year: 2023).*

(Continued)

*Primary Examiner* — David M Schindler
(74) *Attorney, Agent, or Firm* — Polsinelli PC (57) ABSTRACT

The invention provides an apparatus (10, 14) for detecting objects that are submerged in a body of water or at least partly buried in a bed of the body of water. According to a first aspect, the apparatus comprises a support structure (16) adapted to be mounted to a remotely operated towed vehicle, ROTV (12), a plurality of acoustic transducers (27.x) mounted to the support structure (16), and at least one magnetic sensor (28.x) mounted to the support structure (16). According to a second aspect, the apparatus comprises a remotely operated towed vehicle, ROTV (12), the ROTV (Continued)

(12) comprising at least one control flap (38.x) operable to control a sub-surface depth of the ROTV (12) when the ROTV (12) is towed in the body of water, a support structure (16) mounted to the ROTV (12), and a plurality of acoustic transducers (27.x) mounted to the support structure (16). The invention further provides a method, a computer system, and a machine-readable medium.

13 Claims, 5 Drawing Sheets

(51) Int. Cl.
*G01V 1/38* (2006.01)
*G01V 3/15* (2006.01)
*G01V 11/00* (2006.01)

(58) Field of Classification Search
CPC ........ G01V 1/001; G01V 1/38; G01V 1/3808; G01V 1/3843; B63B 21/66; B63B 2211/02; B63B 21/663; B63G 8/42; G01S 7/521; G01S 15/86; G01S 15/88; G01S 15/89
See application file for complete search history.

(56) References Cited

U.S. PATENT DOCUMENTS

| | | | |
|---|---|---|---|
| 5,532,975 | A | 7/1996 | Elholm |
| 6,185,156 | B1 | 2/2001 | Bouyoucos |
| 2004/0108854 | A1 | 6/2004 | Nichols |
| 2010/0060286 | A1 | 3/2010 | Summerfield et al. |
| 2012/0134234 | A1 | 5/2012 | Roberts et al. |
| 2013/0182531 | A1 | 7/2013 | Gagliardi et al. |
| 2014/0165898 | A1 | 6/2014 | Cierpka et al. |
| 2017/0261629 | A1 | 9/2017 | Gunnarsson et al. |
| 2021/0124085 | A1 | 4/2021 | Chabert et al. |

FOREIGN PATENT DOCUMENTS

| | | | |
|---|---|---|---|
| CN | 111831000 | A * | 10/2020 |
| DE | 102011116613 | A1 | 4/2013 |
| DE | 102013105593 | A1 | 12/2014 |
| EP | 0010331 | A1 | 4/1980 |
| JP | 2997635 | B2 * | 1/2000 |
| WO | 2005057234 | A1 | 6/2005 |
| WO | 201305693 | A1 | 4/2013 |
| WO | 2016142885 | A1 | 9/2016 |
| WO | 2016176052 | A1 | 11/2016 |
| WO | 2019145520 | A1 | 8/2019 |

OTHER PUBLICATIONS

Hydrodynamic Profiles, SCRI Group, obtained from https://www.scrigroup.com/limba/engleza/122/HYDRODYNAMIC-PROFILES85892.php, obtained on Oct. 7, 2023.*
The Engineer, First for Technology & Innovation, pp. 1 and 23, Jun. 2016. (Year: 2016).*
TACO Marine, Trim & Molding > Flex Trim, obtained on Feb. 22, 2024, obtained from https://tacomarine.com/flex-trim. (Year: 2024).*
Everything you need to know: 316L Stainless Steel, CPV manufacturing, obtained from https://www.cpvmfg.com/news/1-is-for-low-carbon-all-about-316-stainless-steel/#:~:text=316l%20steel%20has%20high%20formability,generators%20or%20sewage%20water%20filters, obtained on Oct. 26, 2024.*
International Search Report and Written Opinion; PCT Application No. PCT/EP2019/051928; mailed May 21, 2019.
Fugro: "Fugro Geowing", fugro.com, Mar. 24, 2017, ,XP002791068, retreived from Internet: URL:https://www.fugro.com/docs/default-source/Our-Services/asset-integrity/geowing_equipment_flyer2017_lr.pdf?sfvrsn=0.
Search Report; German Application No. 102018201251.2; mailed Dec. 14, 2018.
English abstract of DE102011116613; retrieved from www.espacenet.com on Jul. 17, 2020.
English abstract of DE102013105593; retrieved from www.espacenet.com on Jul. 17, 2020.
English abstract of CN103144752; retrieved from www.espacenet.com on Jul. 17, 2020.
English abstract of CN1651868; retrieved from www.espacenet.com on Jul. 17, 2020.
ScanFish Katria Brochure, Intelligent wide-sweep ROTV for magnetometer surveys, Marine Survey Solutions (EIVA), www.eiva.com; 2014.
SES-2000 quatrro Brochure, Parametric Sub-bottom Profiler, Innomar, www.innomar.com; retrieved Jul. 2020.

* cited by examiner

DETECTING OBJECTS SUBMERGED IN A BODY OF WATER OR AT LEAST PARTLY BURIED IN A BED OF THE BODY OF WATER

REFERENCE TO RELATED APPLICATIONS

This application claims the benefit of priority to Patent Convention Treaty Application PCT/EP2019/051928, filed on Jan. 26, 2019, titled DETECTING OBJECTS SUBMERGED IN A BODY OF WATER OR AT LEAST PARTLY BURIED IN A BED OF THE BODY OF WATER, which in turn claims priority to German Patent Application DE 10 2018 201 251.2, filed on Jan. 26, 2018, titled DETECTING OBJECTS SUBMERGED IN A BODY OF WATER OR AT LEAST PARTLY BURIED IN A BED OF THE BODY OF WATER, both of which are incorporated herein by reference in their entirety.

FIELD OF THE INVENTION

The present invention relates to the field of detecting objects that are submerged in a body of water or are partly or fully buried in a bed of the body of water. Such objects can be, for example and without limitation, pipelines, cables, or objects known as Unexploded Ordnance (UXO).

BACKGROUND OF THE INVENTION

Detecting objects underwater or objects buried in a sea bed is an important task. Numerous solutions have been presented, each with their own associated problems. Particular difficulties arise in the accurate determination of the depth of pipelines and cables, and/or in the detection of Unexploded Ordnance (UXO).

US 2014/0165898 A1 discloses an unmanned underwater vehicle for localizing and examining an object, for example a pipeline, arranged at the bottom of a body of water. The vehicle comprises a multi-sensor system including a 3D underground sonar and at least one further sensor. The at least one further sensor may comprise at least one camera, a side scan sonar device, a multi-beam sonar device, a front scan sonar device and/or at least one magnetic sensor and/or gradiometer probes and/or a magnetometer, in particular a vector magnetometer, of a magnetic field detection device. The unmanned vehicle is configured as an autonomous underwater vehicle or as a cable operated underwater vehicle. Such vehicles are complex devices, which are expensive to build and to maintain.

WO 2016/142885 A1 discloses a detection system and method to check the position of a pipeline in a bed of a body of water. The system comprises a support connected to a vessel by a connection system. The connection system comprises actuators that enable adjusting an immersion depth of the support in the body of water. A plurality of acoustic wave sources and a number of acoustic wave receivers are distributed along the support. In alternative embodiments, the sources comprise either piezoelectric elements, or magnetodynamic or magnetostrictive transducers.

OBJECTS AND SUMMARY

It is an object of the present invention to provide a relatively simple and cost-efficient apparatus that nevertheless facilitates good detection capabilities. It is a further object of some embodiments of the present invention to provide a technique for using measurement data provided by the apparatus to determine a distance of a detected object relative to the apparatus in a depth direction.

The present invention is defined by the independent claims. The dependent claims concern optional features of some embodiments of the invention. Due account is to be taken of any element which is equivalent to an element specified in the claims.

According to a first aspect of the invention, an apparatus for detecting objects comprises a support structure adapted to be mounted to a remotely operated towed vehicle (ROTV), a plurality of acoustic transducers mounted to the support structure, and at least one magnetic sensor mounted to the support structure. This first aspect is based on the idea using both a plurality of acoustic transducers and at least one magnetic sensor, all mounted to a support structure, which in turn is adapted to be mounted to, or in some embodiments actually mounted to, an ROTV. Basing the apparatus on an ROTV is a relatively inexpensive solution, and at the same time the use of both acoustic and magnetic sensing provides superior detection capabilities.

According to a second aspect of the invention, an apparatus for detecting objects comprises an ROTV, the ROTV comprising at least one control flap operable to control a sub-surface depth of the ROTV when the ROTV is towed in the body of water, a support structure adapted to be mounted to the ROTV, and a plurality of acoustic transducers mounted to the support structure. The use of acoustic transducers in combination with an ROTV that can operate at a controlled sub-surface depth is surprisingly effective in obtaining good detection results. For example and without limitation, the ROTV can be programmed to track the bed of the body of water (e.g., the seabed) at a constant altitude (distance between sensor and bed of the body of water). This provides a stable platform for the acoustic transducers, and also for further sensors which may be used in some embodiments (such as at least one magnetic sensor). Tracking the bed of the body of water at a constant altitude, as it is done in some embodiments, may improve the quality of the detection results and allow high resolution data collection, for at least the reason that the recorded signal strength is constant across the dataset. This is particularly true for magnetic sensors, which are used in some embodiments.

Further aspects of the invention comprise a method, computer system and machine-readable medium which facilitate using measurement data provided by an apparatus according to the invention, comprising the operations of using first measurement data provided by the at least one magnetic sensor of the apparatus to determine an offset of a detected object relative to the apparatus in at least one direction orthogonal to a depth direction, and using second measurement data provided by the plurality of acoustic transducers to determine a distance of the detected object relative to the apparatus in the depth direction. This inventive use of both magnetic and acoustic information addresses a long-felt need to obtain accurate depth measurements, which can be especially difficult for pipelines, high voltage power cables, or relatively small discrete objects.

A further application example in some embodiments is the detection of Unexploded Ordnance (UXO). For example, the WWII German aluminium mine (LMB) can be found in large quantity in the North Sea. This mine has a very small ferrous content in its detonator and therefore a small magnetic response. The magnetic response of an LMB is similar to the expected magnetic response of small geological features (such as boulders) and other background noise. When using one or more magnetic sensors only for the detection of LMB, the number of false positives can be very high. However, the acoustic sensors are capable of detecting the LMB quite easily because of its size (diameter=60 cm, length=170-220 cm). The combination of magnetic and acoustic readings is especially advantageous in some embodiments, as it allows cross-correlation of the two datasets and reduces the number of false positives.

The machine-readable medium according to the present invention may comprise suitable program instructions to realize the recited operations, for example on a general-purpose computer or in a programmable integrated circuit. The machine-readable medium may in some embodiments be a tangible medium like, for example, a computer disk or a CD-ROM or a semiconductor memory.

BRIEF DESCRIPTION OF THE DRAWINGS

Further features, objects and advantages of the invention will become apparent from the following detailed description, in connection with the annexed schematic drawings, in which.

DETAILED DESCRIPTION OF EMBODIMENTS OF THE INVENTION

Figure 4:
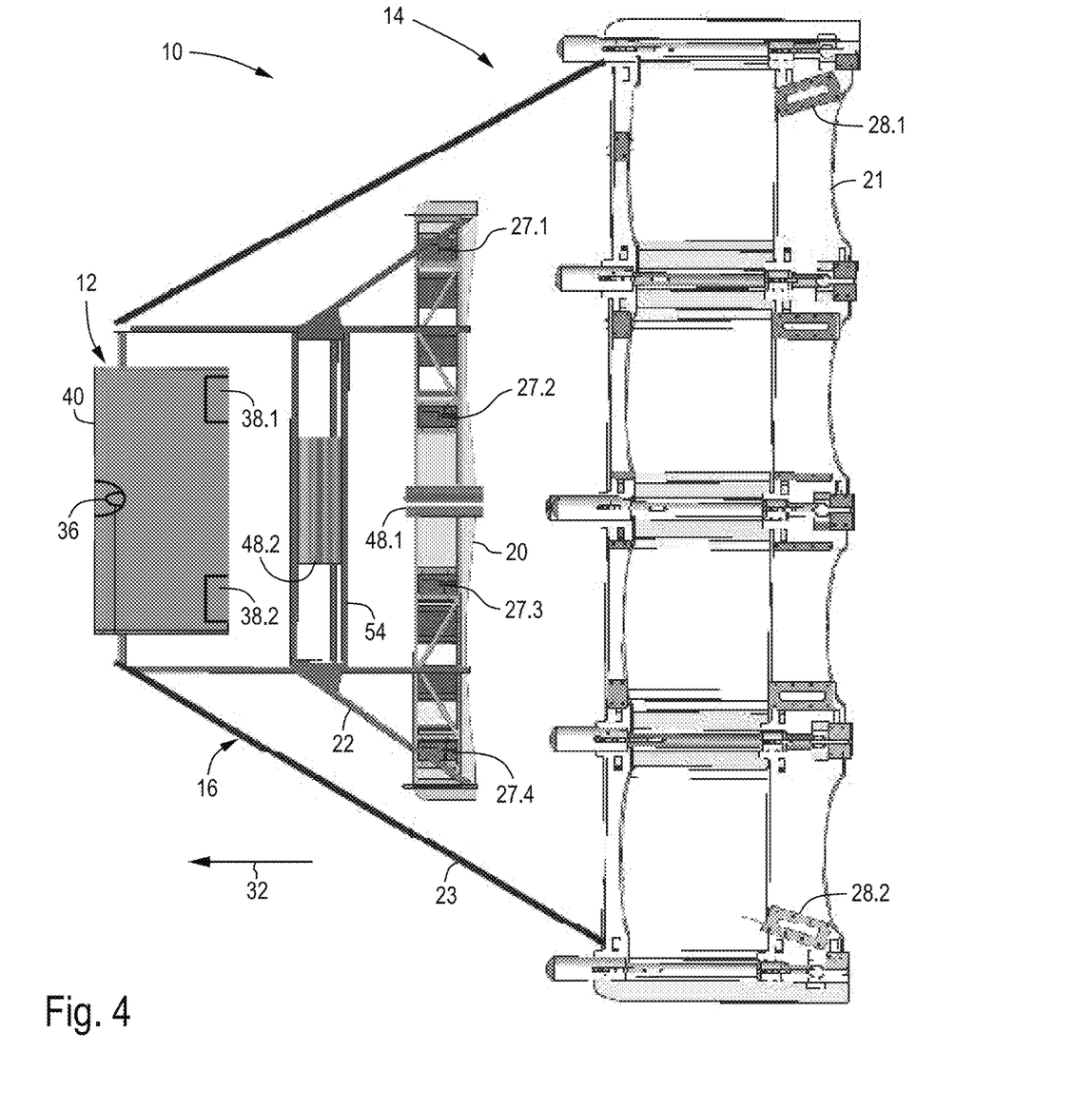
FIG. 4 shows a bottom view of a further embodiment of the present invention.

The apparatus according to the two embodiments shown in FIGS. 1-6 is a detection system 10 comprising a remote operated towed vehicle (ROTV) 12 and a detection assembly 14. The detection assembly 14 comprises a support structure 16 and a plurality of detection devices 18. In the first embodiment, which is shown in FIGS. 1-3, 5 and 6, the support structure 16 comprises a carrier wing 20 and a frame 22 that connects the carrier wing 20 to the ROTV 12. In the second embodiment, which is shown in FIG. 4, the support structure 16 comprises a first carrier wing 20, a second carrier wing 21, a first frame 22 that connects the first carrier wing 20 to the ROTV 12, and a second frame 23 that connects the second carrier wing 21 to the ROTV 12. In an alternative embodiment, the second frame 23 may connect the second carrier wing 21 to the first frame 22, which is in turn connected to the ROTV 12.

The detection devices 18 are mounted on the carrier wing 20 in the first embodiment (FIGS. 1-3, 5 and 6), and on the two carrier wings 20, 21 in the second embodiment (FIG. 4). The detection devices 18 generally include a plurality of acoustic transducers and plurality of magnetic sensors. However, the present invention also comprises embodiments in which the detection devices 18 do not comprise any magnetic sensors or only a single magnetic sensor, and/or in which additional kinds of detection devices 18 are used. The present invention is further not limited with respect to the mounting location of the detection devices 18. For example, some or all of the detection devices 18 can be mounted to the (first) frame 22, or to the second frame 23, if present, or to other portions of the detection assembly 14. Some (but not all) detection devices 18 can also be mounted to the ROTV 12.

In the first embodiment according to FIGS. 1-3, 5 and 6, all detection devices 18 (i.e., all acoustic transducers and all magnetic sensors) are mounted to the single carrier wing 20. On the other hand, in the second embodiment according to FIG. 4, all acoustic transducers are mounted to the first carrier wing 20, and all magnetic sensors are mounted to the second carrier wing 21. This separation helps to reduce interference between the acoustic transducers and the magnetic sensors. For example, in some embodiments the first and second carrier wings 20, 21 are spaced so that each acoustic transducer is spaced from the respectively closest magnetic sensor by at least 0.5 m or by at least 1.0 m or by at least 1.5 m. Further embodiments with two carrier wings 20, 21 are envisaged, in which the acoustic transducers and the magnetic sensors are distributed in another way between these carrier wings 20, 21.

In the first sample embodiment according to FIGS. 1-3, 5 and 6, the plurality of acoustic transducers of the detection devices 18 comprises an emitting acoustic transducer 24 and seven receiving acoustic transducers 26.1, 26.2, ..., 26.7; the latter will in the following be referred to as transducers 26.$x$. For example and without limitation, the receiving acoustic transducers 26.1, 26.2, ..., 26.7 can be spaced at regular intervals of 1.0 m each, or more generally at intervals in the range of 0.5 m to 2.0 m each. In operation, the emitting acoustic transducer 24 emits a high frequency acoustic signal, and reflections thereof are recorded by the receiving acoustic transducers 26.$x$. The plurality of magnetic sensors in the first sample embodiment comprises two magnetic sensors 28.1 and 28.2, which will be referred to as sensors 28.$x$ in the following.

In the second sample embodiment according to FIG. 4, four dual-mode acoustic transducers 27.1, 27.2, 27.3 and 27.4 are used, which each have emitting and receiving capabilities; these dual-mode transducers will be referred to as transducers 27.$x$ in the following. No dedicated emitting transducer is required. Each dual-mode transducer 27.$x$ is capable of emitting a high-frequency acoustic signal, and is further capable of recording reflected signals that have either been emitted from other transducers or even from the present transducer at an earlier time. For example and without limitation, the dual-mode transducers 27.$x$ are arranged on a surface of the first carrier wing 20, spaced at regular intervals of 1.0 m each, or more generally at intervals in the range of 0.5 m to 2.0 m each. In a variant of the second embodiment, some of the transducers used may be single-mode receiving transducers. The plurality of magnetic sensors in the second sample embodiment comprises two magnetic sensors 28.1 and 28.2 (referred to as sensors 28.$x$ in the following), which are arranged on a surface of the second carrier wing 21.

Figure 1:
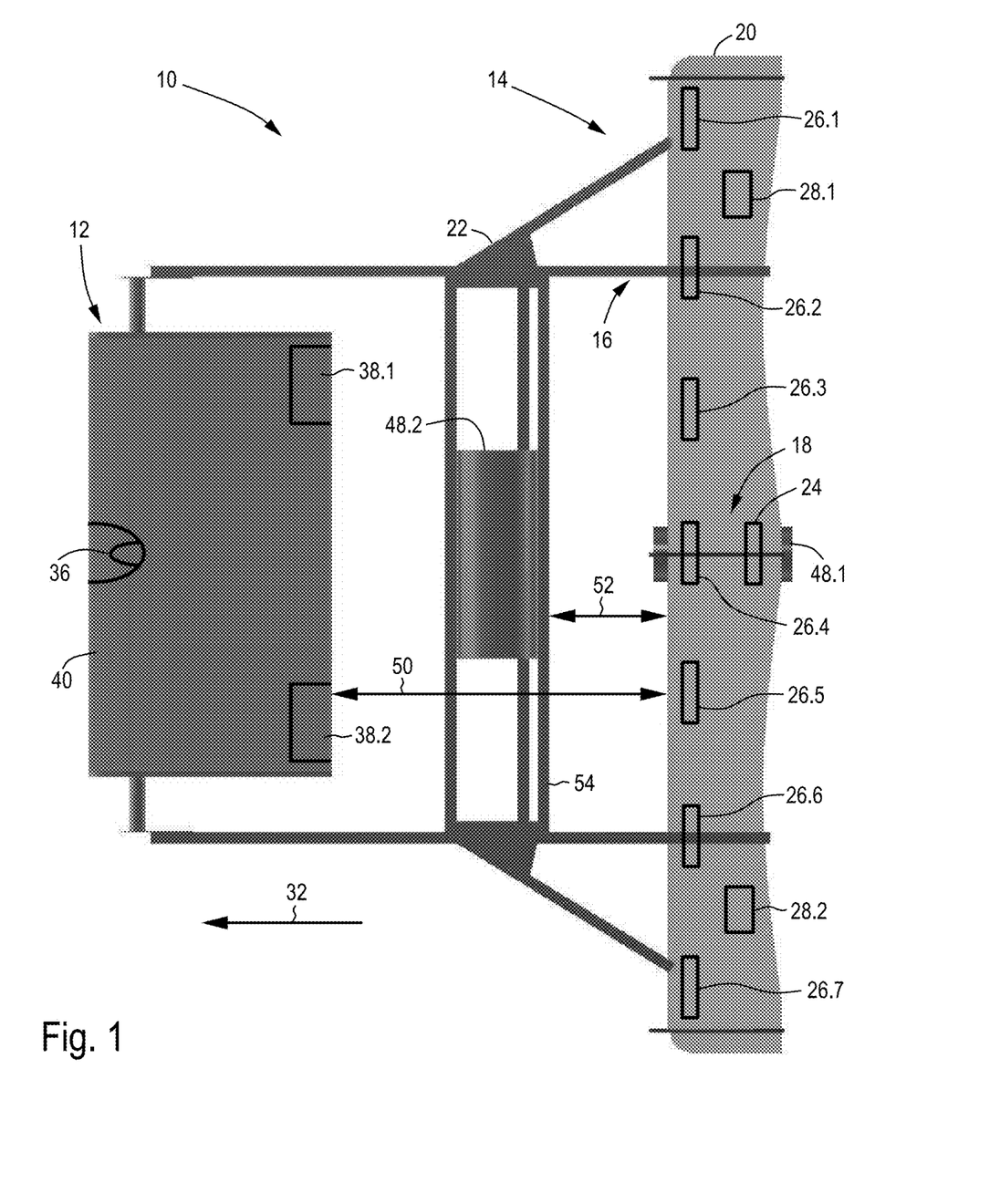
FIG. 1 shows a top view of a first sample embodiment of the present invention.
Figure 2:
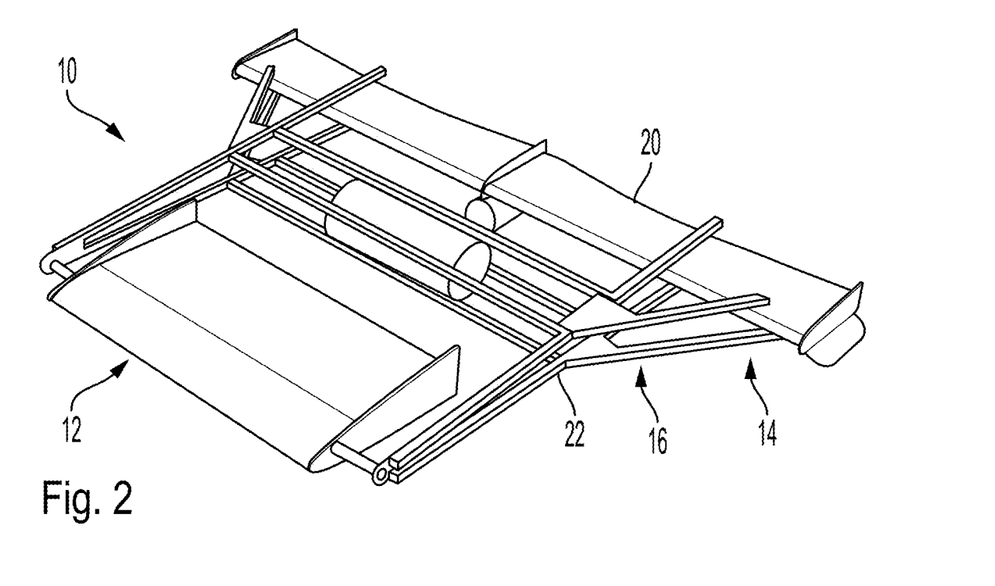
FIG. 2 shows a first perspective view of the embodiment of FIG. 1, with a general viewing direction to the front and top of the apparatus.
Figure 3:
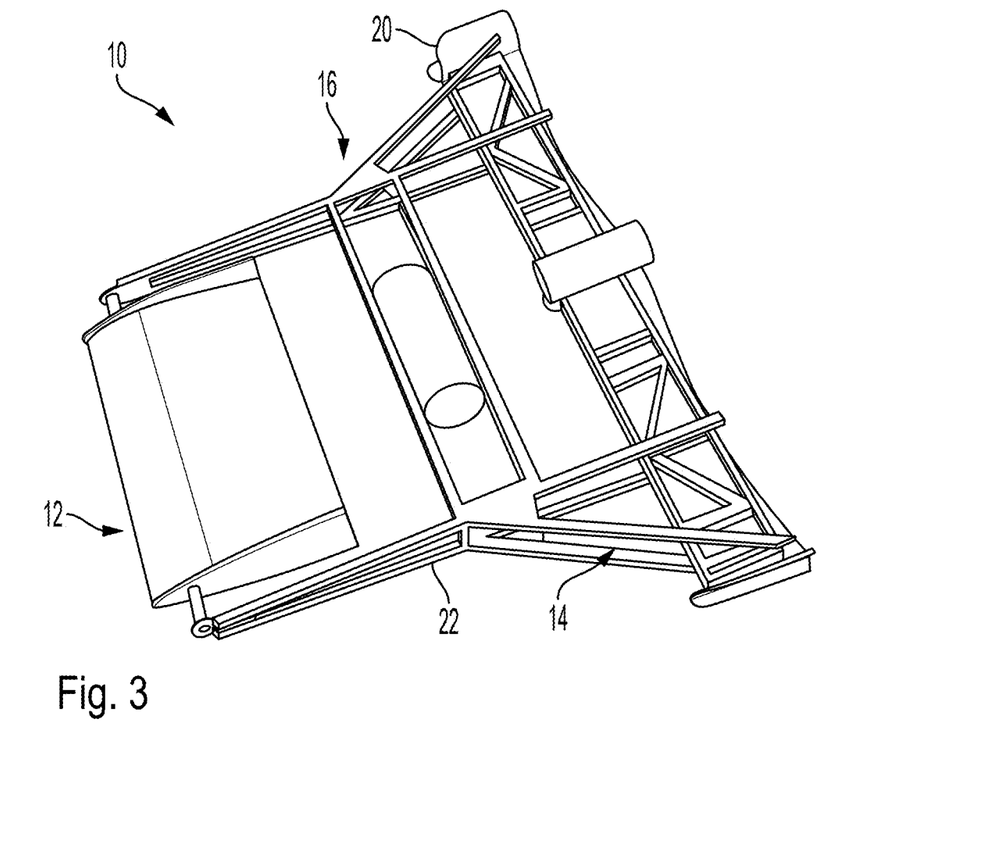
FIG. 3 shows a second perspective view of the embodiment of FIG. 1, with a general viewing direction to the side and bottom of the apparatus.

The present invention is not limited to the kinds and numbers of transducers 24, 26.$x$, 27.$x$ and sensors 28.$x$ described above. For example, a variant of the first embodiment may use at least one dual-mode transmitter/receiver transducer (similarly to transducers 27.$x$), and a variant of the second embodiment may use at least one dedicated emitting transducer and/or at least one dedicated receiving transducer (similarly to transducers 24 and 26.$x$). In further alternative embodiments, fewer or more transducers 24, 26.x, 27.x and/or sensors 28.x are provided. As an example, an embodiment is envisaged in which the plurality of detection devices 18 comprise only four to six dual-mode acoustic transducers, without any magnetic sensors. As another example, an embodiment is envisaged in which the plurality of detection devices 18 comprise seven receiving acoustic transducers 26.x and two magnetic sensors 28.x as shown in FIG. 1, but two emitting acoustic transducers positioned near the ends of the carrier wing 20. In this embodiment, the two emitting acoustic transducers provide additional redundancy in the event of failures.

The ROTV 12 is known as such. In the present sample embodiment, an ROTV available under the mark ScanFish from the company EIVA a/s, Skanderborg, Denmark may be used. The ROTV 12 is adapted to be towed through a body of water 30 (FIG. 5), such as the sea or a lake, by a manned or unmanned towing vessel (not shown in the drawings) along a towing direction 32 (FIGS. 1, 4, 5 and 6). A tow line 34 (FIG. 5) engages a coupling element 36 (FIGS. 1 and 4) of the ROTV 12. The tow line 34 is, in the present embodiment, fully or partially integrated with an electrical and/or optical cable for supplying the detection system 10 with electrical power and/or providing a high-volume data transmission path. In other embodiments, the electrical and/or optical cable may be separate from the tow line 34.

The ROTV 12 is adapted, when being towed through the body of water 30, to control an elevation of the ROTV 12. For this purpose, the ROTV 12 comprises a number of control flaps 38.1 and 38.2, which are referred to as flaps 38.x in the following. The control flaps 38.x are pivotably attached to a wing structure 40 of the ROTV 12 having the general shape of a hydrodynamic profile. One or more actuators (not shown in the drawings) are operable to set an angle of inclination of the control flaps 38.x relative to the wing structure 40. In this way, the ROTV 12—and with it the entire detection system 10—can be controlled to assume a desired sub-surface depth 42 when being towed through the body of water 30. For example, the sub-surface depth 42 can be set to be a constant value from a surface 44 of the body of water 30, or a variable value that follows the contours of a bed 46 of the body of water 30 at a constant altitude 45 (the altitude 45 being the distance between the detection system 10 and the bed 46), or a variable value that follows a predetermined depth profile.

In some embodiments that comprise a second carrier wing 21, this carrier wing 21 may be known as such under the mark Fugro Geowing. The second carrier wing 21 may comprise a plurality of control flaps and actuators that further serve to control the sub-surface depth 42 of the entire detection system 10 to a desired depth.

Returning to the construction of the detection assembly 14, in presently described sample embodiments the frame(s) 22, 23 is/are generally formed of non-ferrous and marine grade material, such as, for example and without limitation, stainless steel, aluminium, brass, fibre glass, and/or carbon fibre. To the extent feasible, common stock materials are used for constructing the frame(s) 22, 23, in order to reduce costs and facilitate repairs which might become necessary. The carrier wing(s) 20, 21 may, in the presently described sample embodiments, be formed of marine grade plastic materials such as, for example and without limitation, Acetyl, Delrin, HMWPE, and/or UHMWPE. The carrier wing(s) 20, 21 may be in the general form of a hydrodynamic profile that reduces drag and/or stabilizes the path of the detection system 10.

The presently described sample embodiments further comprise two watertight housings 48.1 and 48.2, which will be referred to as housings 48.x in the following. The housings 48.x are mounted to the (first) carrier wing 20 and the (first) frame 22, respectively. The housings 48.x hold various electronic and signal processing components used to operate the detection devices 18 and process the resulting data. Because the detection system 10 is connected to the towing vessel via a high-speed data transmission cable in the presently discussed embodiments, most of the required data processing and data storage capabilities are provided at the towing vessel. This reduces the costs of the detection system 10 and makes it particularly robust. It further reduces the necessary size of the housings 48.x, which in turn leads to reduction of the drag and/or turbulence generated by the housings 48.x.

It is believed that a detection system 10 according to embodiments of the present invention may, for example and without limitation, have a size of about 3 m×5 m (first embodiment) or about 5 m×5 m (second embodiment), a swath (footprint of the bed 46 which can be surveyed at any one time) of at least 4 m in water depth of at least 8 m, and will achieve a survey speed of 2 to 5 knots.

One function of the (first) frame 22 in the presently discussed embodiments is to provide sufficient spacing 50 between the ROTV 12 and the closest receiving acoustic transducer 26.x (first embodiment) or the closest dual-mode acoustic transducer 27.x (second embodiment). This spacing 50 ensures that turbulence generated by the ROTV 12 does not negatively affect the operation of the acoustic transducers 26.x, 27.x. For example, embodiments are envisaged in which this spacing 50 is at least 1.0 m or at least 1.5 m or at least 2.0 m. Similarly, the (first) frame 22 provides a certain distance of spacing 52 between a traverse 54 of the (first) frame 22 and the closest receiving acoustic transducer 26.x (first embodiment) or the closest dual-mode acoustic transducer 27.x (second embodiment), especially in a region of the traverse 54 in which the housing 48.2 is located. For example and without limitation, this spacing 52 may, in some embodiments, be at least 0.5 m or at least 1.0 m. Different embodiments of the invention may comply with both, or with only one, of the above spacing requirements.

In the presently described embodiments, the receiving acoustic transducers 26.x (first embodiment) or the dual-mode acoustic transducers 27.x (second embodiment)—and in some embodiments further ones of the detection devices 18—are arranged along the (first) carrier wing 20 in a direction that is generally transverse or approximately orthogonal to the towing direction 32 of the detection system 10. Furthermore, if the detection system 10 is used to detect an elongate object such as a pipeline 56 (FIG. 5 and FIG. 6) or an underwater cable, the intended towing direction 32 is generally along, and to the extent possible right above, the elongate object.

In many (but not all) sample embodiments of the present invention, the detection system 10 comprises both acoustic transducers 24, 26.x, 27.x and magnetic sensors 28.x. These embodiments are particularly suited for applications in which not only the location of an object in terms of longitude and latitude (expressed, for example, as respective offsets in the X and Y coordinates to the position of the towing vessel), but also its depth 57 (expressed, for example, as the vertical distance along the Z coordinate from the detection system 10, or as the depth by which the object is buried in the bed 46) are to be determined.

Figure 5:
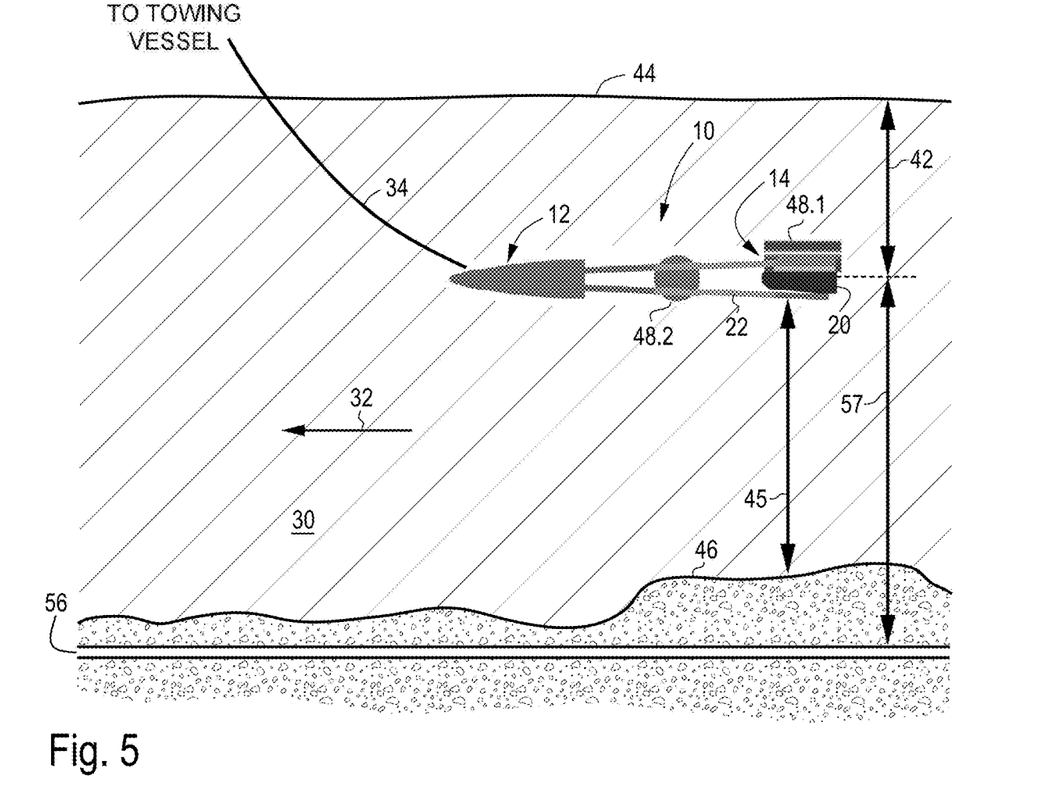
FIG. 5 shows a side view of the apparatus of FIG. 1, as it is towed through a body of water.
Figure 6:
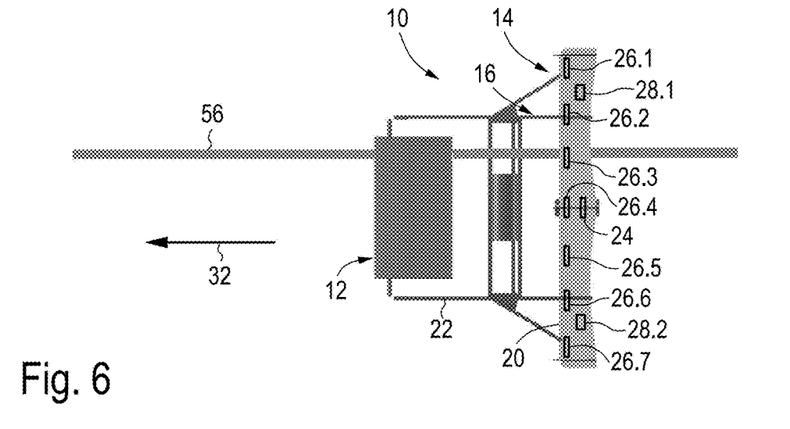
FIG. 6 shows a top view of the apparatus of FIG. 1, with a pipeline running underneath, FIG. 7 and FIG. 8 each show visualizations of magnetic data.

According to the example shown in FIGS. 5 and 6, the location and depth 57 of the pipeline 56 are to be determined, with the detection system 10 being towed in the towing direction 32 generally along the direction of the pipeline 56. Instead of the pipeline 56, the presently discussed teaching is just as well applicable to other kinds of objects to be detected, for example and without limitation cables (such as cables supplying electricity, or electric or optic data transmission cables), or discrete targets such as Unexploded Ordnance (UXO).

Figure 7:
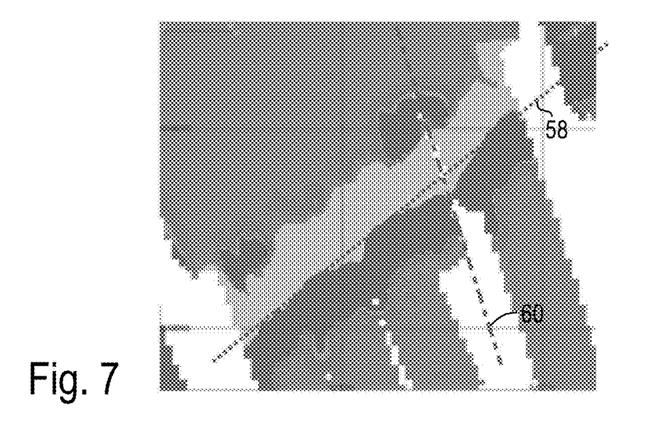

The example shown in FIG. 7 visualizes magnetic field data of a portion of the bed 46 in which an elongate object, such as the pipeline 56 or a cable, is buried. The extension of the elongate object is indicated by the dotted line 58 in FIG. 7, and the different magnetic field strengths, which correspond to different responses of the magnetic sensors 28.x, are shown by different grey levels in FIG. 7.

Figure 8:
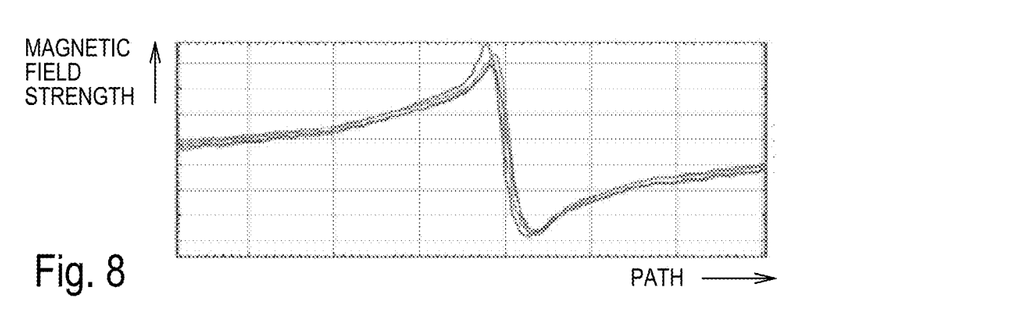

The curves in FIG. 8 depict the magnetic field strength (indicated at the Y axis) along the path 60 shown in FIG. 7 (indicated at the X axis). It is remarked that the path 60, which runs oblique to the extension of the elongate object, has been selected to clearly demonstrate the magnetic field levels shown in FIG. 8 and is different from the preferred towing direction 32 shown in FIGS. 5 and 6. Clearly, the magnetic field levels, which correspond to the response of the magnetic sensors 28.x, allow the location of the elongate object to be determined, such as by determining locations of a maximum gradient magnitude of the magnetic field strength. This technique is known as such.

In an embodiment in which the detection system 10 is used for determining the location and depth 57 of an object such as the pipeline 56, the location (X and Y coordinates) of the object is determined in the way described above from the response of the magnetic sensors 28.x. As shown in FIG. 6, if the object is the pipeline 56, the towing direction 32 may, in some embodiments, be adjusted so that it is aligned with the extension of the pipeline 56. The pipeline 56 thus runs transverse to the carrier wing 20 and at approximately the middle of the carrier wing 20 (i.e., at the location of the emitting acoustic transducer 26.4). The fact that the pipeline 56 is shifted towards the emitting acoustic transducers 26.3 and even 26.2 in the representation of FIG. 6 depicts a positioning error which can hardly be avoided in real-world operations. However, the towing direction 32 may also be different, especially if the object to be detected is not a pipeline 56, but a discrete object.

Figure 9:
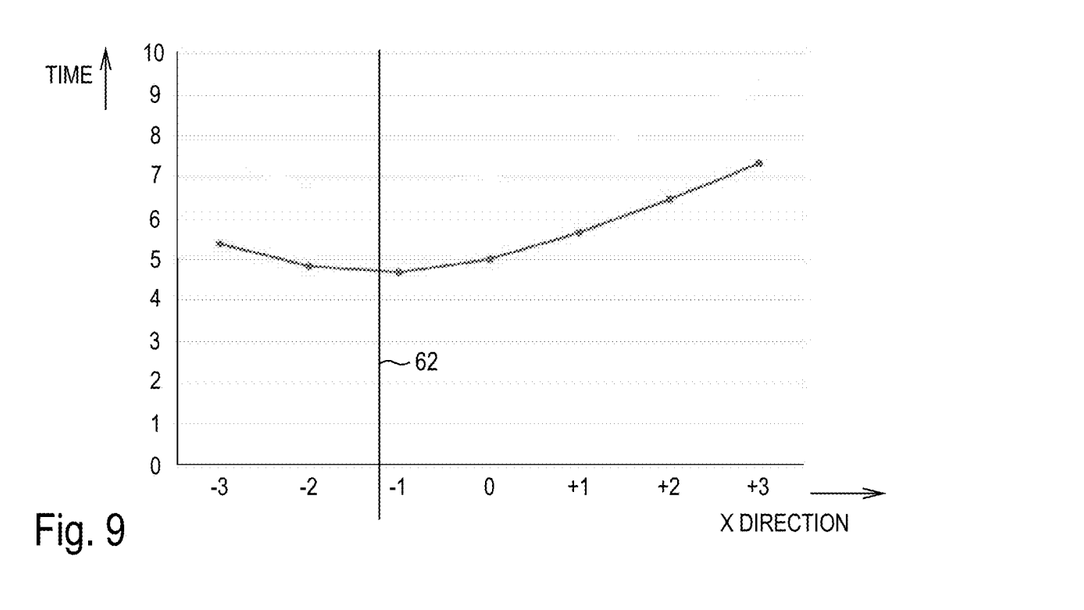
FIG. 9 shows a diagram with total travel times of reflected sound waves.

The depth 57 of the object, i.e., the distance along the depth direction or Z coordinate, is then determined using the acoustic transducers 24 and 26.x. A high-frequency sound signal is emitted by the emitting acoustic transducer 24, and the reflections off the object (e.g., the pipeline 56) are recorded by the receiving acoustic transducers 26.x. A possible result is shown in FIG. 9, where each dot in the diagram represents one receiving acoustic transducer 26.x. The middle dot associated with the value 0 on the X axis represents the middle transducer 26.4, the dots associated with the values +1 and −1 represent the transducers 26.3 and 26.5, which are spaced 1.0 m each from the middle transducer 26.4, and so on. The values on the Y axis show the time between transmission and receipt of the sound signal, which corresponds to the travel distance from the emitting acoustic transducer 24 to the pipeline 56 or other reflective object and back to the respective receiving acoustic transducer 26.x. The vertical line 62 represents the position of the pipeline 56 as measured by the magnetic location system using the magnetic sensors 28.x (i.e., a position as shown in FIG. 6, which runs almost underneath the transducer 26.3, slightly shifted towards the transducer 26.2).

The total traveling distance of the sound signal is then the sum of the hypotenuses of two right-angled triangles, the first triangle representing the traveling distance of the sound signal before reflection and the second triangle representing the traveling distance after reflection. The following relationship applies, wherein the X direction is the direction transverse to the direction of the pipeline 56 (i.e., the X direction is the direction in which the carrier wing 20 extends), and the Z distance is the depth of the pipeline 56:

$$\text{Total traveling distance} = \sqrt{\begin{array}{l}(X \text{ offset between sender and pipeline})^2 + \\ (Z \text{ distance between sender and pipeline})^2\end{array}} + \\ \sqrt{\begin{array}{l}(X \text{ offset between receiver and pipeline})^2 + \\ (Z \text{ distance between receiver and pipeline})^2\end{array}}$$

The respective offsets in the X direction between the position of the pipeline 56 and the individual sending and receiving acoustic transducers 24, 26.x are known based on the known dimensions of the detection assembly 14 and the location of the pipeline 56 determined by the magnetic measurements. Any possible differences in the Z direction between the sending and receiving acoustic transducers 24, 26.x are also known. This enables a determination of the depth 57 of the pipeline 56, i.e., the vertical distance of the pipeline 56 below the detection devices 18.

It is emphasized once more that the reference to the pipeline 56 in the above description is only exemplary, and that the presently disclosed teaching is applicable to all kinds of objects, including but not limited to pipelines, cables, and Unexploded Ordnance (UXO). The combination of magnetic and acoustic measurements can not only be used to determine the depth of objects with a high degree of accuracy and reliability, but also to reduce the number of false positives in UXO detection.

For the sake of easier understanding, FIGS. 5-9 and the above description of these figures are based on the first sample embodiment with a single carrier wing 20 and separate transmitting and receiving acoustic transducers 24, 26.x. It is apparent that these teachings are equally applicable, mutatis mutandis, to the second embodiment of the detection system 10 with two carrier wings 20, 21 and dual-mode acoustic transducers 27.x, as well as to further embodiments which have been mentioned above and/or are obvious to the skilled person. These include, for example and without limitation, embodiments in which two or more emitting acoustic transducers (including dual-mode transducers in the emitting mode) are used. In such embodiments, a full set of measured travel times, i.e., one full line as shown in FIG. 9, is obtained for each of the two or more emitting acoustic transducers. Using multiple emitting acoustic transducers provides redundancy against failures and also permits the trustworthiness of each measurement to be determined by a comparison with other measurements.

The particulars contained in the above description of sample embodiments should not be construed as limitations of the scope of the invention, but rather as exemplifications of some embodiments thereof. Many variations are possible and are immediately apparent to the person skilled in the arts. In particular, this concerns variations that comprise a combination of features of the individual embodiments disclosed in the present specification. Accordingly, the scope of the invention should be determined not by the embodiments illustrated, but by the appended claims and their legal equivalents.

LIST OF REFERENCE NUMERALS 10 detection system
12 remote operated towed vehicle (ROTV)
14 detection assembly
16 support structure
18 (plurality of) detection devices
20 (first) carrier wing
21 second carrier wing
22 (first) frame
23 second frame
24 emitting acoustic transducer
26.x receiving acoustic transducer
27.x dual-mode acoustic transducer
28.x magnetic sensor
30 body of water
32 towing direction
34 tow line
36 coupling element
38.x control flap
40 wing structure of ROTV
42 sub-surface depth
44 surface of body of water
45 altitude (distance between bed and apparatus)
46 bed of body of water
48.x housing
50 spacing between ROTV and receiving acoustic transducers
52 spacing between traverse of frame and receiving acoustic transducers
54 traverse of frame
56 pipeline
57 depth/distance in depth direction
58 position of elongate object in FIG. 6
60 path of sensor movement
62 position of pipeline

The invention claimed is:

1. A system for detecting objects that are submerged in a body of water or at least partly buried in a bed of the body of water, the system comprising:
a remotely operated towed vehicle, ROTV;
a support structure adapted to be mounted to the ROTV;
a plurality of acoustic transducers; and
at least one magnetic sensor,
wherein the support structure comprises:
a first carrier wing mounted on a first frame, the plurality of acoustic transducers mounted on the first carrier wing, the first frame adapted to be mounted to the ROTV, the first frame formed of non-ferrous and marine grade material, and
a second carrier wing mounted on a second frame, and the second frame mounted to the first frame, and the at least one magnetic sensor mounted to the second carrier wing, the second frame formed of non-ferrous and marine grade material, and
wherein the first carrier wing is positioned between the ROTV and the second carrier wing, and
wherein a space between the first carrier wing with the plurality of acoustic transducers and the second carrier wing with the at least one magnetic sensor provides reduced interference between the plurality of acoustic transducers and the at least one magnetic sensor.

2. The system of claim 1, further comprising at least one housing that is attached to the first frame, and wherein the first frame is configured to provide a spacing of at least 0.5 m between the at least one housing and the plurality of acoustic transducers.

3. The system of claim 1, wherein the first frame is configured to provide a spacing of at least 1.0 m between the ROTV and each of the plurality of acoustic transducers.

4. The system of claim 1, wherein the ROTV is mounted to the support structure.

5. The system of claim 1, wherein one or more of the plurality of acoustic transducers are configured to emit and receive.

6. The system of claim 1, further comprising a non-transitory machine-readable medium having program instructions adapted to cause a computing apparatus, when executing the program instructions, to perform operations of:
using first measurement data provided by the at least one magnetic sensor to determine an offset of a detected object relative to the system in at least one direction orthogonal to a depth direction, and
using second measurement data provided by the plurality of acoustic transducers to determine a distance of the detected object relative to the system in the depth direction.

7. The system of claim 6, wherein the second measurement data comprises an indication of time elapsed between generation of an acoustic signal by an acoustic transducer of the plurality of acoustic transducers configured to emit and receipt of a reflection of the acoustic signal by an acoustic transducer of the plurality of acoustic transducers configured to receive.

8. A system for detecting objects that are submerged in a body of water or at least partly buried in a bed of the body of water, the system comprising:
a remotely operated towed vehicle, ROTV, the ROTV comprising at least one control flap operable to control a sub-surface depth of the ROTV when the ROTV is towed in the body of water;
a support structure mounted to the ROTV;
a plurality of acoustic transducers; and
at least one magnetic sensor,
wherein the support structure comprises:
a first carrier wing to which the plurality of acoustic transducers are mounted, and the support structure further comprises a first frame connecting the ROTV to the first carrier wing, the first frame formed of non-ferrous and marine grade material, and
a second carrier wing, and a second frame to which the second carrier wing is mounted, and the at least one magnetic sensor is mounted to the second carrier wing, the second frame formed of non-ferrous and marine grade material, and
wherein the first carrier wing is positioned between the ROTV and the second carrier wing, and
wherein a space between the first carrier wing with the plurality of acoustic transducers and the second carrier wing with the at least one magnetic sensor provides reduced interference between the plurality of acoustic transducers and the at least one magnetic sensor.

9. The system of claim 8, further comprising at least one housing that is attached to the first frame, and wherein the first frame is configured to provide a spacing of at least 0.5 m between the at least one housing and each of the plurality of acoustic transducers.

10. The system of claim 8, wherein the first frame is configured to provide a spacing of at least 1.0 m between the ROTV and the plurality of acoustic transducers.

11. The system of claim 8, wherein the system is adapted for being towed through the body of water in a towing direction via the ROTV, and wherein the first carrier wing has a main extension in a direction traverse to the towing direction.

12. The system of claim 8, wherein the ROTV further comprises a wing structure and at least one actuator, the at least one actuator being operable to set an angle of inclination of the at least one control flap relative to the wing structure.

13. The system of claim 8, further comprising a coupling element configured to couple a cable to a towing vessel, the cable configured to provider a transmission path to the towing vessel.

\* \* \* \* \*